(12) United States Patent
Lasher et al.

(10) Patent No.: US 10,097,746 B2
(45) Date of Patent: Oct. 9, 2018

(54) METHOD AND SYSTEM FOR DYNAMICALLY ADJUSTING A CAMERA SETTING FOR A VIDEO STREAM

(71) Applicant: Tribune Broadcasting Company, LLC, Chicago, IL (US)

(72) Inventors: Richard M. Lasher, San Jose, CA (US); Dana A. Lasher, Morgan Hill, CA (US); Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 52 days.

(21) Appl. No.: 15/200,741

(22) Filed: Jul. 1, 2016

(65) Prior Publication Data
US 2018/0007251 A1 Jan. 4, 2018

(51) Int. Cl.
| | |
|---|---|
| H04N 5/232 | (2006.01) |
| H04N 5/917 | (2006.01) |
| H04N 21/24 | (2011.01) |
| H04N 21/238 | (2011.01) |
| H04N 21/231 | (2011.01) |
| H04N 21/2183 | (2011.01) |
| H04N 21/2187 | (2011.01) |
| H04N 7/06 | (2006.01) |

(52) U.S. Cl.
CPC ..... *H04N 5/23206* (2013.01); *H04N 5/23216* (2013.01); *H04N 5/917* (2013.01); *H04N 7/06* (2013.01); *H04N 21/2183* (2013.01); *H04N 21/2187* (2013.01); *H04N 21/23106* (2013.01); *H04N 21/23805* (2013.01); *H04N 21/24* (2013.01)

(58) Field of Classification Search
CPC .......... H04N 5/23206; H04N 5/23216; H04N 5/917; H04N 21/2183; H04N 21/23106
See application file for complete search history.

(56) References Cited

U.S. PATENT DOCUMENTS

| | | |
|---|---|---|
| 8,908,005 B1 | 12/2014 | Leske et al. |
| 2004/0075750 A1 | 4/2004 | Bateman |

(Continued)

OTHER PUBLICATIONS

International Search Report and Written Opinion dated Sep. 25, 2017 issued in connection with International Application No. PCT/US2017/037262, filed on Jun. 13, 2017.

(Continued)

*Primary Examiner* — Daniel M Pasiewicz
(74) *Attorney, Agent, or Firm* — McDonnell Boehnen Hulbert & Berghoff LLP (57) ABSTRACT

In one aspect, an example method for dynamically adjusting a camera setting for a video stream includes: (i) receiving, by a computing system, video content captured by a camera operating in accordance with a camera setting; (ii) generating, by the computing system, a video stream representing the video content; and (iii) while generating the video stream: (a) determining, by the computing system, an amount of packets in a memory buffer; (b) determining, by the computing system, a time period since the camera setting was last adjusted; and (c) using, by the computing system, the determined amount of packets in the memory buffer and the determined time period since the camera setting was last adjusted as a basis to adjust the camera setting.

23 Claims, 3 Drawing Sheets

(56) References Cited

U.S. PATENT DOCUMENTS

| | | | |
|---|---|---|---|
| 2006/0088092 A1* | 4/2006 | Chen | G08B 13/19656 |
| | | | 375/240.01 |
| 2009/0103607 A1* | 4/2009 | Bajpai | H04N 21/23406 |
| | | | 375/240.02 |
| 2011/0105226 A1 | 5/2011 | Perlman | |
| 2011/0158313 A1* | 6/2011 | Ogata | H04N 7/181 |
| | | | 375/240.02 |
| 2011/0267942 A1* | 11/2011 | Aybay | H04L 41/0816 |
| | | | 370/230 |
| 2011/0273606 A1 | 11/2011 | Hara | |
| 2012/0093505 A1* | 4/2012 | Yeap | H04L 12/2889 |
| | | | 398/45 |

OTHER PUBLICATIONS

U.S. Appl. No. 15/200,696, entitled "Method and System for Dynamically Adjusting a Data Rate of a Video Stream", filed Jul. 1, 2016.

Non-Final Office Action dated Mar. 8, 2018 for U.S. Appl. No. 15/200,696.

Notice of Allowance dated Jun. 15, 2018 for U.S. Appl. No. 15/200,696.

\* cited by examiner

METHOD AND SYSTEM FOR DYNAMICALLY ADJUSTING A CAMERA SETTING FOR A VIDEO STREAM

USAGE AND TERMINOLOGY

In this disclosure, with respect to all reasonable derivatives of such terms, unless otherwise specified and/or unless the particular context clearly dictates otherwise, each usage of "a" or "an" means at least one, and each usage of "the" means the at least one.

BACKGROUND

Unless otherwise specified, the materials described in this section are not prior art to the claims in this disclosure and are not admitted to be prior art by inclusion in this section.

Computing systems, such as mobile phones, tablet computers, and laptop computers, can generate and output media content in the form of streaming media. For example, while a computing system is capturing video content using a camera, the computing system can provide the video content to other devices, in real-time, in the form of a live video stream.

SUMMARY

In a first aspect, an example method includes: (i) receiving, by a computing system, video content captured by a camera operating in accordance with a camera setting; (ii) generating, by the computing system, a video stream representing the video content; and (iii) while generating the video stream: (a) determining, by the computing system, an amount of packets in a memory buffer; (b) determining, by the computing system, a time period since the camera setting was last adjusted; and (c) using, by the computing system, the determined amount of packets in the memory buffer and the determined time period since the camera setting was last adjusted as a basis to adjust the camera setting.

In a second aspect, a non-transitory computer-readable medium is disclosed. The computer-readable medium has stored thereon instructions that, upon execution by a processor, cause performance of a set of acts including: (i) receiving, by a computing system, video content captured by a camera operating in accordance with a camera setting; (ii) generating, by the computing system, a video stream representing the video content; and (iii) while generating the video stream: (a) determining, by the computing system, an amount of packets in a memory buffer; (b) determining, by the computing system, a time period since the camera setting was last adjusted; and (c) using, by the computing system, the determined amount of packets in the memory buffer and the determined time period since the camera setting was last adjusted as a basis to adjust the camera setting.

In a third aspect, a computing system includes a camera and a memory buffer and is configured for performing a set of acts including: (i) receiving video content captured by the camera operating in accordance with a camera setting; (ii) generating a video stream representing the video content; and (iii) while generating the video stream: (a) determining an amount of packets in the memory buffer; (b) determining a time period since the camera setting was last adjusted; and (c) using the determined amount of packets in the memory buffer and the determined time period since the camera setting was last adjusted as a basis to adjust the camera setting.

DETAILED DESCRIPTION

I. Overview

As indicated above, a computing system can generate a video stream representing video content and can provide the video stream to various devices. The computing system can generate the video stream in various ways. For example, a camera of the computing system can capture video content in accordance with one or more camera settings (e.g., frame rate, frame size, shutter speed), and an encoder of the computing system can encode the video content to generate a video stream having a particular data rate (e.g., a bit rate). The video stream can also be formatted into packets of data, which are stored temporarily in a memory buffer of the computing system before the computing system transmits the packets from the memory buffer to another entity, such as another memory buffer and/or another device.

In some instances, a camera setting used by the camera for capturing the video content can affect the data rate of the video stream generated from that video content. By way of example, if the camera captures the video content at a high frame rate (e.g., more frames per second), the generated video stream can have a high data rate, whereas if the camera captures the video content at a low frame rate (e.g., less frames per second), the generated video stream can have a low data rate. Further, a video stream having a high data rate can be a high quality video stream, whereas a video stream having a low data rate can be a low quality video stream. However, a video stream with a high data rate can fill up the memory buffer at a faster rate than a video stream with a low data rate. Thus, the computing system may be able to continuously provide a low quality video stream with minimal or no latency, but may not be able to continuously provide a high quality video stream without undesirable latency.

The present disclosure provides a way to help the computing system maximize the quality of the video stream while minimizing latency of the video stream. In particular, the present disclosure provides a technique for dynamically adjusting a camera setting for the video stream (e.g., a camera setting used by the camera for capturing the video content from which the video stream is generated), based on a consideration of time and a consideration of the amount of data packets in the memory buffer of the computing system.

According to the present disclosure, an example method includes a computing system receiving video content captured by a camera operating in accordance with a camera setting. For instance, the camera can capture the video content at a particular frame rate. The method also includes generating a video stream representing the video content, such as in the manner described above.

Further, the method also includes, while generating the video stream, the computing system determining an amount of packets in the memory buffer and determining a time period since the camera setting was last adjusted. If no adjustment has yet been made to the camera setting, the time period can be, for instance, a time period since the camera began capturing the video content using an initial camera setting (or, alternatively, since the computing system began generating the video stream). Whereas, if any adjustments have been made to the camera setting since the camera began capturing the video content, the time period can be a time period since the most recent adjustment to the camera setting.

Still further, the method includes, while generating the video stream, the computing system using the determined amount of packets in the memory buffer and the determined time period since the camera setting was last adjusted as a basis to adjust the camera setting. In one example, if the computing system determines that the amount of packets in the memory buffer is less than a threshold amount of packets and that a threshold extent of time has passed since the camera setting was last adjusted, the computing system can responsively increase the camera setting. This can allow the computing system to continuously provide the video stream at high quality with minimal or no latency.

Whereas, if the computing system determines that the amount of packets in the memory buffer is greater than a threshold amount of packets and that a threshold extent of time has passed since the camera setting was last adjusted, the computing system can responsively decrease the camera setting of the video stream. This can allow the computing system to keep the quality of the video stream as high as possible while still being able to continue to provide the video stream with minimal or no latency.

II. Example Architecture

A. Computing Device

Figure 1:
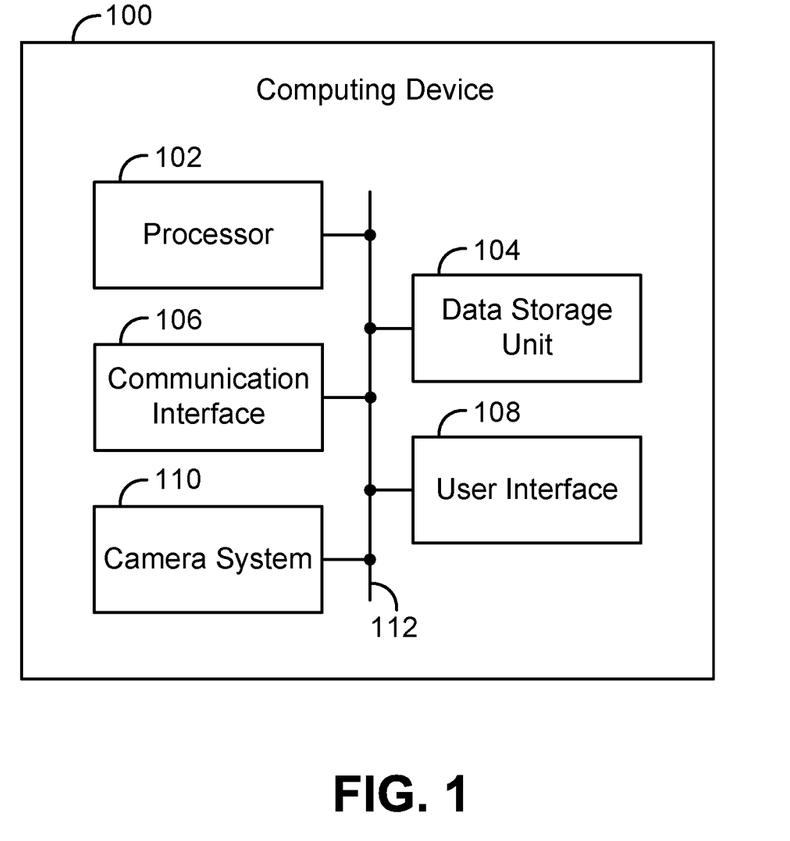
FIG. 1 is a simplified block diagram of an example computing device.

FIG. 1 is a simplified block diagram of an example computing device 100. Computing device 100 can perform various acts and/or functions, such as those described in this disclosure (including the accompanying drawings). Computing device 100 can include various components, such as processor 102, data storage unit 104, communication interface 106, user interface 108, and/or camera system 110. These components can be connected to each other (or to another device, system, or other entity) via connection mechanism 112.

In this disclosure, the term "connection mechanism" means a mechanism that facilitates communication between two or more devices, systems, or other entities. A communication mechanism can be a relatively simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108.

Data storage unit 104 can also store other types of data, such as those types described in this disclosure. In one example, data storage unit 104 can include one or more memory buffers that can receive, from one or more other components of computing device 100, a video stream in the form of data packets and can then temporarily store the data packets. In some instances, the memory buffer(s) can take the form of a data queue (i.e., a memory buffer that employs a First-In First-Out (FIFO) scheme).

Communication interface 106 can allow computing device 100 to connect to and/or communicate with another entity according to one or more protocols. In one example, communication interface 106 can be a wired interface, such as an Ethernet interface or a high-definition serial-digital-interface (HD-SDI). In another example, communication interface 106 can be a wireless interface, such as a cellular (e.g., 4G or 3G) or a Wi-Fi interface. Each connection described in this disclosure can be a direct connection or an indirect connection, the latter being a connection that passes through and/or traverses one or more entities, such as such as a router, switcher, or other network device. Likewise, each transmission described in this disclosure can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

Camera system 110 can include various components for facilitating capture and processing of video content, such as a camera, a frame grabber, and an encoder. The camera can capture video content in the form of a series of still digital images, or "frames," and perhaps then transmit the video content to the encoder. Further, the camera can capture the video content in accordance with one or more camera settings, such as a particular frame rate, frame size, and/or shutter speed, among other possible camera settings.

The frame grabber can interface with the camera to assist in capturing the video content, such as by receiving the video content from the camera and then storing the video content and/or transmitting the video content to the encoder. The encoder can receive the video content from the frame grabber (or, in some instances, directly from the camera itself), encode the video content to generate a video stream, format the video stream into data packets, and transmit the packets of the video stream to data storage unit 104. In one example, the encoder can transmit packets of the video stream to a memory buffer of data storage unit 104, which can receive and temporarily store the packets.

The encoder can encode video content according to various standards. For example, the encoder can encode video content in accordance with the H.264 (MPEG-4 AVC) standard, the MPEG-2 Part 2 standard, or the VP8 standard. The encoder can also be configured to encode corresponding audio content according to various standards such as MP3 or AAC. In one example, the encoder can be included as a component separate from the rest of camera system 110.

Computing device 100 can take various forms, such as a workstation, a desktop computer, a laptop, a tablet, a television, a set-top box, and/or a mobile phone (e.g., a smart phone).

B. Computing System

Figure 2:
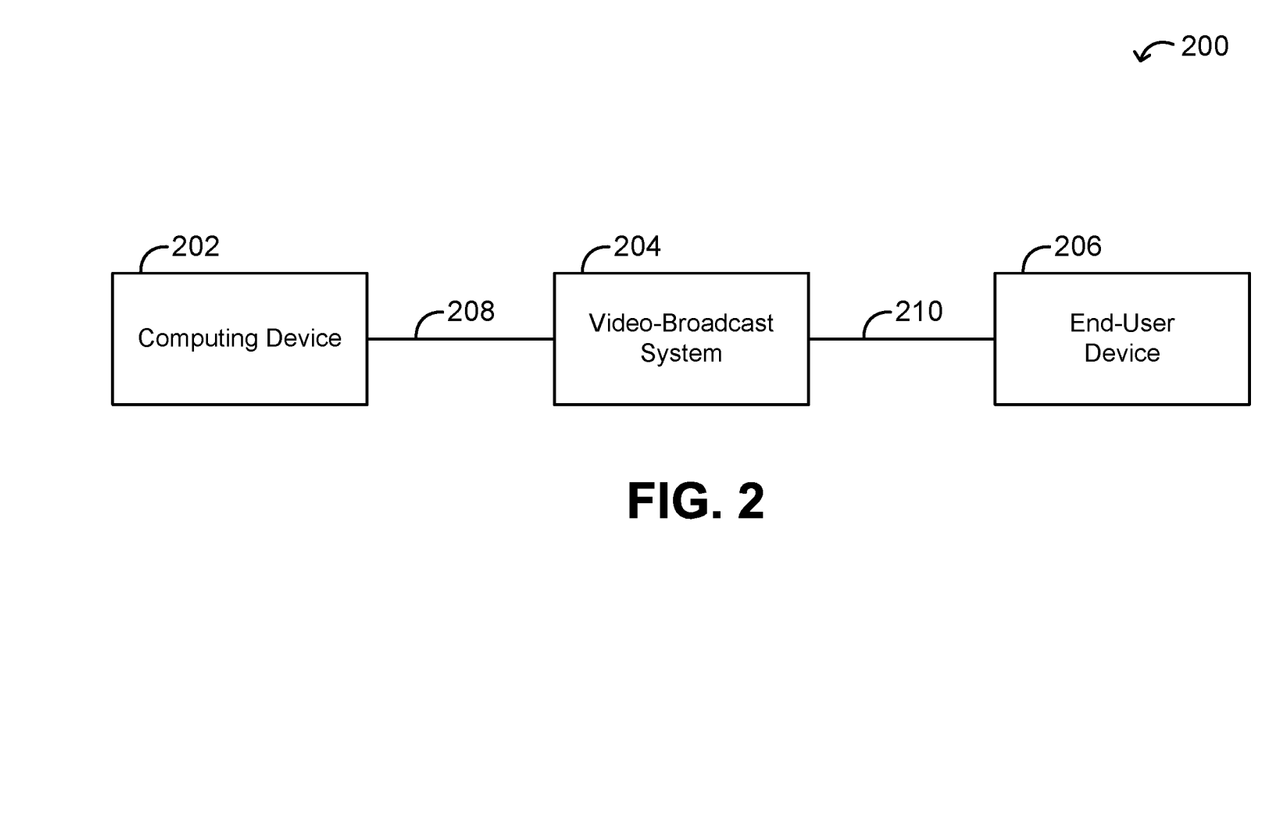
FIG. 2 is a simplified block diagram of an example computing system.

FIG. 2 is a simplified block diagram of an example computing system 200. In this disclosure, a computing system is a system that includes at least one computing device. In some instances, a computing system can include at least one other computing system.

Computing system 200 can include various components, such as computing device 202 (e.g., computing device 100), video-broadcast system (VBS) 204, and end-user device 206, each of which can be implemented as a computing system. Computing system 200 can also include connection mechanism 208, which connects computing device 202 with VBS 204; and connection mechanism 210, which connects VBS 204 with end-user device 206.

Computing device 202 can take various forms. For instance, computing device 202 can take the form of computing device 100 described above. As such, computing device 202 can generate video content such as a video stream. As computing device 202 generates the video stream, one or more components of computing system 200, such as VBS 204, can receive the video stream from computing device 202 and can in turn provide the video stream to an end-user device. In this manner, an end user can view a live video stream being generated by computing device 202.

VBS 204 can receive the video content and transmit the video content to end-user device 206 for presentation of the video content to an end user via a user interface. In practice, VBS 204 can transmit video content to a large number of end-user devices for presentation of the video content to a large number of end users. VBS 204 can include various components, such as a terrestrial antenna or a satellite, each of which can be implemented as a computing system. VBS 204 can also include a video-production system (VPS) that is configured to receive video content from computing device 202 and/or generate its own video content. Either type of video content can serve as or be made part of a video program (e.g., a news program).

In this disclosure, the term "video broadcast" means the distribution of video content via any means. As such, VBS 204 can transmit video content to end-user device 206 in various ways. For example, VBS 204 can transmit video content to end-user device 206 over-the-air or via a packet-based network such as the Internet.

Video content can be generated, transmitted, and/or received in various ways and/or according to various standards. For example, the act of generating video content can include generating a video stream representing the video content. As another example, the act of transmitting and/or receiving video content can include transmitting and/or receiving a video stream representing the video content, such as over Internet Protocol (IP) or in accordance with the HD-SDI standard. Also, the act of generating, transmitting, and/or receiving video content can include generating, transmitting, and/or receiving an encoded or decoded version of the video content.

Each of the video-based systems or devices described in this disclosure can include or be integrated with a corresponding audio-based system or device. Likewise, the video content described in this disclosure can include or be integrated with corresponding audio content. For instance, computing device 202 can encode video content to generate a video stream, encode corresponding audio content to generate an audio stream, and then combine the video stream with the corresponding audio stream to generate a multimedia stream for transmission to another system or device.

III. Example Operations

Computing system 200 and/or components of computing system 200 can perform various acts. These and related features will now be described.

A. Receiving Video Content and Generating a Video Stream

As noted above, a computing system such as computing device 202 can receive video content captured by a camera operating in accordance with a camera setting and can then generate a video stream representing the video content.

The act of receiving the video content captured by the camera can be performed in various ways. In one example, in line with the discussion above, the camera (and perhaps additionally the frame grabber) of computing device 202 can capture the video content and can then store the video content in the data storage unit of computing device 202 and/or transmit the video content to another component of computing device 202, such as the encoder. Alternatively, a camera located remotely from (but in communication with) computing device 202 can capture the video content and transmit the video content to computing device 202. Computing device 202 can receive the video content from the remote camera and then store the video content in the data storage unit of computing device 202 and/or transmit the video content to another component of computing device 202, such as the encoder.

The act of the camera capturing the video content can be performed in various ways. In some aspects, the camera can operate according to one or more camera settings and can capture the video content in the form of a series of frames. Examples of camera settings can include: (i) a frame rate at which the camera captures the video content (i.e., a number of individual frames that comprise each unit of time of the video content, such as 30 frames per second (fps)), (ii) a frame size (also referred to as "resolution") (i.e., the dimensions (width by height) of each individual frame, often expressed in pixels, such as 320×240, 720×576, 1280×720, or 1920×1080), and/or (iii) a shutter speed (i.e., the amount of time that each individual frame is exposed to light due to the camera's shutter being open, such as $\frac{1}{100}$ seconds).

The camera settings that are available for use by the camera can vary from computing device to computing device. To illustrate this, consider for example a first computing device, such as a smart phone, and a second computing device, such as a tablet computer. In this example, the first computing device can be configured to support only frame sizes smaller than or equal to 1280×720 and/or can be configured to support only frame rates less than or equal to 30 fps. Whereas, the second computing device can be configured to support only frame sizes smaller than or equal to 1440×1080 and/or can be configured to support only frame rates less than or equal to 60 fps. Other scenarios are possible as well.

The act of generating the video stream can be performed in various ways. For instance, after the camera (and perhaps additionally the frame grabber) of computing device 202 captures the video content and transmits the video content to the encoder of computing device 202 as described above, the encoder can then receive the video content from the camera or the frame grabber and can encode the video content in accordance with one or more encoding parameters to generate a video stream having a particular data rate. The encoder can also format the video stream into data packets and can transmit the packets to a memory buffer of computing device 202, which in turn can receive and temporarily store the packets.

A data rate of a video stream refers to an amount of data of the video stream that is streamed per unit of time. In some instances, a data rate of a video stream can take the form of a "bit rate" (or "bitrate") of the video stream, which is the number of bits of the video stream that are streamed per unit of time, and which is quantified using units such as bits per second (bit/s, or bps). For example, a video stream having a bitrate of 500 kilobits per second (kbps) means that each second of the video stream contains 500 kilobits of data (i.e., the video stream is streamed at a rate of 500 kilobits per second).

A data rate of a video stream can affect various properties of the video stream, such as the quality (e.g., resolution) and size (i.e., the amount of data required to represent the video stream) of the video stream, as well as the rate at which the video stream takes up space in the memory buffer. To illustrate this, consider for example a first video stream having a first data rate and a second video stream having a second data rate that is lower than the first data rate. In this example, the first video stream having the higher data rate can be of higher quality than the second video stream and can require a higher amount of data to represent the first video stream (and thus take up more space in the memory buffer) than the amount of data required to represent the second video stream. Further, the first video stream can take up space in the memory buffer at a faster rate than the second video stream due to the encoder having more data to send to the memory buffer for the first video stream compared to the second video stream. In addition, assuming uniform packet size, the amount of packets of the first video stream stored in the memory buffer can be larger than the amount of packets of the second video stream stored in the memory buffer.

Computing device 202 can select the data rate of the video stream, and can do so in various ways. In some examples, computing device 202 can select the data rate in a direct manner. For instance, computing device 202 can have stored various data rate options from which to choose, and can select a particular data rate to be used as a default data rate unless instructed or configured to select a different data rate. In another instance, a user of computing device 202 can specify a particular data rate via a user interface of computing device 202, thereby instructing computing device 202 to use the user-specified data rate.

In other examples, computing device 202 can select the data rate in an indirect manner. For instance, computing device 202 (e.g., the encoder of computing device 202) can have access to a table that maps various camera settings to corresponding data rates. Thus, computing device 202 can select a data rate by selecting a camera setting that maps to the desired data rate, as described in greater detail below.

Likewise, computing device 202 can select one or more camera settings according to which to operate, and can do so in various ways. For instance, computing device 202 can have stored various camera setting options from which to choose, and can select a particular camera setting to be used as a default camera setting unless instructed or configured to select a different camera setting. By way of example, computing device 202 can support multiple frame sizes and select whichever supported frame size that is closest to 1280×720 (i.e., 720p) to be used as a default frame size for generating the video stream. In another instance, a user of computing device 202 can specify a particular camera setting via a user interface of computing device 202, thereby instructing computing device 202 to use the user-specified camera setting. In yet another instance, computing device 202 (e.g., the camera of computing device 202) can have access to a table that maps various camera settings to corresponding data rates, such as the table noted above or a different table, and, given a desired data rate, computing device 202 can select a camera setting(s) that maps to the desired data rate and can thus be used of achieve the desired data rate, as described in greater detail below.

Each of the camera settings noted above can affect properties of the resulting video content that the camera captures, which can in turn affect the data rate needed to encode the video content and to generate a video stream representing the video content. If the camera captures the video content in the form of larger frames and/or at a higher frame rate, for instance, the video content can be larger in size and of higher quality, and thus a higher data rate can be needed to encode the video content and generate a video stream. Whereas, if the camera captures the video content in the form of smaller frames and/or at a lower frame rate, for instance, the video content can be smaller in size and of lower quality, and thus a lower data rate can be needed to encode the video content and generate a video stream. Camera settings can affect the properties of the resulting video content in other ways as well.

Accordingly, the act of computing device 202 selecting the data rate can involve referring to the table to select the data rate that corresponds to the camera settings of computing device 202. Alternatively, given a desired data rate, such as a user-specified data rate or a default data rate of computing device 202, the act of computing device 202 selecting the data rate can involve referring to the table to select the camera settings that computing device 202 should use to achieve the desired data rate.

In some implementations, computing device 202 can select the data rate based on a type of network connection over which computing device 202 transmits data, such as the generated video stream, to other devices. For example, if computing device 202 has a connection with a cellular network (e.g., 3G, 4G LTE), computing device 202 can by default select a lower data rate (e.g., 75 kbps) to reduce excessive cellular data consumption. As another example, if computing device 202 has a connection with a Wi-Fi network, computing device 202 can by default select a higher data rate (e.g., 450 kbps). Other techniques for selecting the data rate are possible as well.

Likewise, in some implementations, computing device 202 can select a given camera setting based on a type of network connection over which computing device 202 transmits data, such as the generated video stream, to other devices. For example, if computing device 202 has a connection with a cellular network (e.g., 3G, 4G LTE), computing device 202 can by default select a lower frame rate (e.g., 15 fps), which can in turn result in the generated video stream having a lower data rate to reduce excessive cellular data consumption. As another example, if computing device 202 has a connection with a Wi-Fi network, computing device 202 can by default select a higher frame rate (e.g., 30 fps), which can in turn result in the generated video stream having a higher data rate. Other techniques for selecting camera settings are possible as well.

In other implementations, the act of computing device 202 selecting a given camera setting may be performed independent from the type of network connection over which computing device 202 transmits data. As such, computing device 202 may use the same camera setting(s) for every type of network connection.

As noted above, the act of computing device 202 encoding the video content can involve encoding the video content in accordance with one or more encoding parameters to generate the video stream. For example, computing device 202 can encode the video content according to various encoding standards, such as the H.264 (MPEG-4 AVC) standard, the MPEG-2 Part 2 standard, or the VP8 standard. Such standards can affect the data rate of the resulting video stream while also affecting other properties of the resulting video stream as well.

To illustrate this, consider for example a scenario in which computing device 202 encodes video content using a first standard (e.g., H.264) to produce a first video stream, and separately encodes the same video content using a second, different standard (e.g., MPEG-2 Part 2) to produce a second video stream. In this scenario, both the first video stream and the second video stream can have low data rates, but the first video stream can be of higher quality than the second video stream. Alternatively, the first video stream can have a lower data rate than the second video stream and be of higher quality than the second video stream.

Accordingly, in some implementations, the act of computing device 202 selecting the data rate can involve selecting an encoding standard for use in encoding the video content to generate the video stream having the data rate. For instance, computing device 202 can have stored various encoding standard options from which to choose, and can select a particular encoding standard to be used as a default encoding standard unless instructed or configured to select a different encoding standard. In another instance, a user of computing device 202 can specify a particular encoding standard via a user interface of computing device 202 or by other means, thereby instructing computing device 202 to use the user-specified encoding standard. In yet another instance, given a desired data rate, the act of computing device 202 selecting the data rate can involve selecting the encoding standard that computing device 202 should use to achieve the desired data rate.

In some instances, the act of generating the video stream can also be considered to involve the computing device 202 transmitting the video stream (i.e., the packets of the video stream) from the memory buffer to another memory buffer and/or device, such as to a second memory buffer of computing device 202. In one example, in an arrangement where computing device 202 has a cellular or Wi-Fi network connection, an entity of the cellular or Wi-Fi network can monitor the amount of packets in the second memory buffer of computing device 202 and instruct computing device 202 to transmit packets from the second memory buffer to the entity based on considerations of network bandwidth and/or other channel quality conditions.

The acts of receiving the video content and generating the video stream can involve other actions as well.

B. Dynamically Adjusting a Camera Setting for the Video Stream

Operations involving dynamic adjustment of a camera setting for the video stream are described below. Although these operations involve computing device 202 adjusting a single camera setting, in embodiments where the camera is operating according to multiple camera settings, these operations can be performed with respect to one or more of the multiple camera settings.

As noted above, while computing device 202 is generating the video stream, computing device 202 can determine an amount of packets in the memory buffer.

In addition, while computing device 202 is generating the video stream, computing device 202 can determine a time period since the camera setting was last adjusted. In scenarios where computing device 202 is determining the time period but has not yet adjusted the camera setting, such as a scenario in which computing device 202 has recently started capturing the video content using a default camera setting, the act of computing device 202 determining the time period since the camera setting was last adjusted can involve determining a time period since another type of event occurred. For example, the other type of event can be one of the following: (i) when computing device 202 first selected the camera setting, (ii) when computing device 202 first began capturing the video content using the selected camera setting, (iii) when computing device 202 first began encoding the video content, or (iv) when the encoder transmitted the first packet(s) of the video stream to the memory buffer, among other possibilities.

Once computing device 202 has determined the amount of packets in the memory buffer and determined the time period since the camera setting was last adjusted, computing device 202 can then use the determined amount of packets and time period as a basis to adjust the camera setting.

In some aspects, the act of computing device 202 using the determined amount of packets and time period as a basis to adjust the camera setting can involve making comparisons of the determined amount of packets and time period to respective thresholds and then either increasing or decreasing the camera setting based on the result of those comparisons.

In one aspect, for instance, computing device 202 can (i) determine that the determined amount of packets are less than a threshold amount of packets, (ii) determine that the determined time period is greater than a threshold time period, and (iii) in response to those two determinations, increase the camera setting of the video stream. In this aspect, computing device 202 can use various thresholds, such as a threshold amount of packets having a value in a range of 5 to 15 packets, and a threshold time period having a value in a range of 10 to 20 seconds. By way of example, if computing device 202 determines that there are less than 10 packets in the memory buffer and at least 15 seconds have passed since the camera setting was last adjusted (increased or decreased), computing device 202 can responsively adjust the camera setting by increasing the camera setting by a particular increment.

In another aspect, computing device 202 can (i) determine that the determined amount of packets are greater than a threshold amount of packets, (ii) determine that the determined time period is greater than a threshold time period, and (iii) in response to those making those two determinations, decrease the camera setting of the video stream. In this aspect, computing device 202 can use various thresholds, such as a threshold amount of packets having a value in a range of 20 to 35 packets, and a threshold time period having a value in a range of 1 to 10 seconds. By way of example, if computing device 202 determines that there are more than 30 packets in the memory buffer and at least 3 seconds have passed since the camera setting was last adjusted (increased or decreased), computing device 202 can responsively adjust the camera setting by decreasing the camera setting by a particular increment.

In the context of frame rate, for instance, the increment by which computing device 202 adjusts the camera setting can be particular value expressed in fps or expressed/quantified in some other manner. Further, in the context of shutter speed, the increment by which computing device 202 adjusts the camera setting can be particular value expressed in seconds or expressed/quantified in some other manner.

In the context of frame size, however, the increase or decrease of frame size may not be referred to as an "increment," since any such increase or decrease may not in practice take the form of a fixed increase or decrease in the width and/or height of the frame. Rather, in some scenarios, computing device 202 can support multiple frame sizes, such as 320×240, 720×576, 1280×720, and 1920×1080, and thus the act of increasing or decreasing the frame size can involve determining which frame sizes computing device 202 supports and then switching the current frame size (e.g., a default frame size) to the next highest supported frame size or next lowest supported frame size. For example, if computing device 202 determines that it supports frame sizes of 720×576, 1280×720, and 1920×1080 and by default uses a frame size of 720×576, computing device 202 can increase the frame size by switching the frame size to 1280×720, and computing device 202 can decrease the frame size by switching the frame size to 320×240.

In some aspects, the act of computing device 202 determining the increment can involve using a default, fixed increment for all adjustments to the camera setting. For example, computing device 202 can select a fixed frame rate increment to be a value within a range of 10 fps to 20 fps and adjust the frame rate by the fixed increment for every adjustment. As a more specific example, computing device 202 can use a fixed increment of 15 fps to increase or decrease the frame rate between 15 fps, 30 fps, 45 fps, and 60 fps. Alternatively, computing device 202 can use a fixed increment of 15 fps to toggle the frame rate between only 15 fps and 30 fps such that increasing the frame rate involves increasing the frame rate from 15 fps to 30 fps and decreasing the frame rate involves decreasing the frame rate from 30 fps to 15 fps.

In these aspects, the default, fixed increment can correspond to camera settings at which significant, noticeable, or otherwise desirable jumps in video stream quality occur. For example, in some scenarios, significant jumps in video stream quality can occur when frame rate is adjusted by an increment of 15 fps seconds, such as at 15 fps, 30 fps, 45 fps, and 60 fps, and thus 15 fps can be the fixed increment.

In other aspects, the act of computing device 202 determining the increment can involve determining, for each respective adjustment to the data rate, which increment to use. As a result, computing device 202 can in some scenarios use different increments for at least two successive adjustments to the data rate. For example, computing device 202 can determine, based on one or more of the factors discussed above, such as network connection, encoding standard, packets in the memory buffer, and/or time period since last adjustment, etc., to use a first increment for a first adjustment to the camera setting (e.g., decrease the frame rate from 60 fps to 30 fps by a first increment of 30 fps), but can next determine, based on one or more of the factors, to use a second, different increment for a second, subsequent adjustment to the data rate (e.g., decrease the data rate from 30 fps to 15 fps by a second increment of 15 kbps). Other techniques for determining the increment are possible as well.

In some aspects, the camera setting can be confined to a particular range. For example, the frame rate can be confined to a range of 10 fps to 60 fps kbps such that the data rate never falls below 10 fps and never exceeds 60 kbps. As another example, the shutter speed can be confined to a range of $1/250$ seconds and $1/30$ seconds such that the shutter speed never falls below $1/250$ seconds and never exceeds $1/30$ seconds. As yet another example, the frame size can be confined to the minimum and maximum frame sizes computing device 202 is configured to support, as noted above.

Computing device 202 can perform the acts discussed above in a perodic manner, in order to maintain higher quality of the video stream while minimizing latency. For example, once computing device 202 determines that there are 10 or less packets in the memory buffer, computing device 202 can repeatedly increase the camera setting every 15 seconds until there are more than 10 packets in the memory buffer. As another example, once computing device 202 determines that there are at least 30 packets in the memory buffer, computing device 202 can repeatedly decrease the camera setting every 3 seconds until there are less than 30 packets in the memory buffer. Other examples are possible as well.

In scenarios where the camera setting has reached a maximum value supported by computing device 202 as a result of one or more increases, the camera setting can remain at the maximum value during subsequent "increases". Likewise, where the camera setting has reached a minimum value supported by computing device 202 as a result of one or more decreases, the camera setting can remain at the minimum value during subsequent "decreases."

In some implementations, computing device 202 can take into account the data rate of the video stream as an additional or alternative basis for determining when and/or how to adjust the camera setting. For instance, if computing device 202 determines that the data rate has fallen below a particular lower threshold limit (due to computing device 202 adjusting the data rate itself and/or due to other reasons), computing device 202 can responsively adjust the camera setting in one manner. Whereas, if computing device 202 determines that the data rate has exceeded a particular upper threshold limit (again, due to computing device 202 adjusting the data rate itself and/or due to other reasons), computing device 202 can responsively adjust the camera setting in another, different manner.

In such implementations, computing device 202 can select the lower and upper threshold limits in various ways. For instance, computing device 202 can select the lower and upper threshold limits based on the type of network connection over which computing device 202 is transmitting the video stream to other devices, where each type of network connection can have corresponding lower and upper threshold limits. By way of example, if computing device 202 determines that it is transmitting the video stream over a cellular network connection, computing device 202 can responsively use a lower threshold limit of 100 kbps and an upper threshold limit of 500 kbps. Whereas, if computing device 202 determines that it is transmitting the video stream over a Wi-Fi network connection, computing device 202 can responsively use a lower threshold limit of 500 kbps and an upper threshold limit of 1375 kbps. Other examples of network connections and corresponding threshold limits are possible as well. In practice, such threshold limits can be associated with data rates at which significant changes in video stream quality can occur while computing device 202 is transmitting the video stream over the corresponding network connection.

To illustrate an example of these implementations, consider a scenario in which computing device 202 has a cellular network connection, the frame rate of the video stream is 30 fps, and the frame size of the video stream is 1280×720. In this scenario, if computing device 202 determines that the data rate has fallen below a lower threshold limit of 100 kbps, computing device 202 can responsively (i)

decrease the frame rate from 30 fps to 15 fps and/or (ii) decrease the frame size from 1280×720 to the next lowest supported frame size. As such, computing device 202 can achieve a lower, but still desirable, quality of the video stream despite the video steam having a lower data rate, rather than attempt to generate a higher quality video stream having a lower data rate, which could result in an undesirable user experience in viewing the video stream (e.g., delayed video, freeze frames). This may be advantageous in situations where computing device 202 has bandwidth limitations, as the lower data rate of the video stream can enable computing device 202 to transmit the video stream even with such bandwidth limitations.

As another example of these implementations, consider a scenario in which computing device 202 has a cellular network connection, the frame rate of the video stream is 15 fps, and the frame size of the video stream is 1280×720. In this scenario, if computing device 202 determines that the data rate has exceeded an upper threshold limit of 500 kbps, computing device 202 can responsively (i) increase the frame rate from 15 fps to 30 fps and/or (ii) increase the frame size from 1280×720 to the next highest supported frame size. Other examples are possible as well. For instance, rather than decrease the frame rate and/or frame size when the data rate falls below the lower threshold limit, computing device 202 can instead responsively increase the frame rate and/or frame size.

In some implementations, while computing device 202 is generating the video stream, computing device 202 can transmit the video stream to another computing system, such as VBS 204, via a communication interface with the other computing system (e.g., communication interface 106). The other computing system can then receive and broadcast the video stream.

In some implementations, while computing device 202 is generating the video stream, computing device 202 can present, via user interface of computing device 202 (e.g., user interface 108), an indication of the camera setting. In these implementations, the indication can be an indication of the default camera setting and/or an indication of an adjusted camera setting. Further, computing device 202 can present the indication in response to various events. For instance, computing device 202 can present the indication in response to computing device 202 beginning to generate the video stream and/or in response to computing device 202 adjusting the camera setting.

The indication of the camera setting can take various forms. For example, computing device 202 can provide, via a speaker of computing device 202, an audio indication of the camera setting (e.g., playing the words "thirty frames per second" out of the speaker). Additionally or alternatively, computing device 202 can provide, via a display of computing device 202, a visual indication of the camera setting, such as a numeric indication (e.g., "15 fps") and/or an indication of how the camera setting has been adjusted (e.g., "The camera setting has been adjusted from 15 fps to 30 fps."). Other example indications of the camera setting are possible as well.

In some implementations, while computing device 202 is generating the video stream, computing device 202 can present the video stream via the display. Computing device 202 can present the video stream in various forms. In some instances, computing device 202 can display only the video stream corresponding to the adjusted camera setting. Alternatively, computing device 202 can display only the video stream corresponding to the last-adjusted camera setting (i.e., the video stream before the most recent adjustment to the camera setting). Further, in other instances, computing device 202 can simultaneously display two different forms of the video stream. For example, computing device 202 can simultaneously display a split-screen including both the unencoded video content (e.g., an uncompressed version of the video stream) and the video stream corresponding to the adjusted camera setting. As another example, computing device 202 can simultaneously display a split-screen including both the video stream corresponding to the most recent adjusted camera setting and the video stream corresponding to the previous camera setting (i.e., the camera setting before it was adjusted).

In any or all of the implementations described above, computing device 202 can provide the video stream via the display of computing device 202 with or without the indication of the camera setting.

Figure 3:
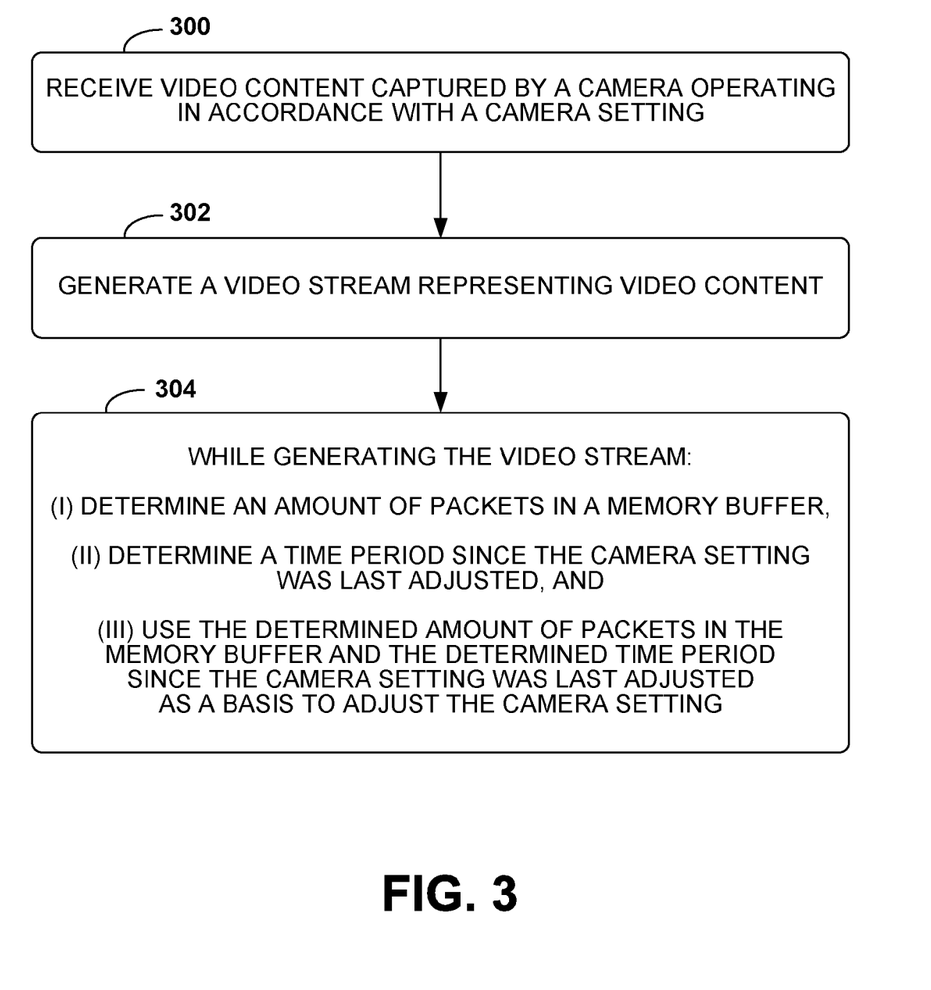
FIG. 3 is a simplified illustration of a flowchart of an example method.

FIG. 3 is a simplified illustration of an example flowchart for dynamically adjusting a camera setting for a video stream. In an example implantation, a computing system such as computing device 202 performs the illustrated acts, although in other implementations, one or more other systems (e.g., VBS 204) can perform some or all of the illustrated acts.

As shown in FIG. 3, at block 300, the computing system receives video content captured by a camera operating in accordance with a camera setting.

At block 302, the computing system generates a video stream representing the video content.

At block 304, while generating the video stream, the computing system (i) determines an amount of packets in a memory buffer, (ii) determines a time period since the camera setting was last adjusted, and then (iii) uses the determined amount of packets in the memory buffer and the determined time period since the camera setting was last adjusted as a basis to adjust the camera setting.

IV. Example Variations

Although some of the acts and/or functions described in this disclosure have been described as being performed by a particular entity, such acts and/or functions can be performed by any entity, such as those described in this disclosure. Further, although the described acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the described acts and/or functions need to be performed to achieve one or more of the benefits provided by this disclosure, and therefore not all acts and/or functions are required.

Although certain variations have been discussed in connection with one or more example of this disclosure, such variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
    receiving, by a computing system, video content captured by a camera operating in accordance with a camera capture setting;

encoding, by the computing system, in accordance with one or more encoding parameters, the video content to generate a video stream representing the video content; and while generating the video stream:
(i) determining, by the computing system, an amount of packets in a memory buffer;
(ii) determining, by the computing system, a time period since the camera capture setting was last adjusted; and
(iii) using, by the computing system, the determined amount of packets in the memory buffer and the determined time period since the camera capture setting was last adjusted as a basis to adjust the camera capture setting.

2. The method of claim 1, wherein the memory buffer is a data queue of the computing system.

3. The method of claim 1,
wherein receiving video content captured by the camera operating in accordance with a camera capture setting comprises receiving video content captured by the camera operating in accordance with a frame rate setting,
wherein determining the time period since the camera capture setting was last adjusted comprises determining a time period since the frame rate setting was last adjusted, and
wherein using the determined amount of packets in the memory buffer and the determined time period since the camera capture setting was last adjusted as a basis to adjust the camera capture setting comprises using the determined amount of packets in the memory buffer and the determined time period since the frame rate setting was last adjusted as a basis to adjust the frame rate setting.

4. The method of claim 1, wherein using the determined amount of packets in the memory buffer and the determined time period since the camera capture setting was last adjusted as a basis to adjust the camera capture setting comprises:
making, by the computing system, a first determination that the determined amount of packets in the memory buffer is less than a threshold amount of packets;
making, by the computing system, a second determination that the determined time period since the camera capture setting was last adjusted is greater than a threshold time period; and
responsive to making the first and second determinations, increasing, by the computing system, the camera capture setting.

5. The method of claim 4, wherein the threshold amount of packets is a value in a range of 5-15 packets, and wherein the threshold time period is a value in a range of 10-20 seconds.

6. The method of claim 4, wherein increasing the camera capture setting comprises increasing a frame rate setting for the video stream by a frame rate setting increment that is a value in a range from 10 frames per second to 20 frames per second.

7. The method of claim 4, wherein the computing system supports multiple frame sizes for the video stream ranging from a smallest frame size to a largest frame size,
wherein increasing the camera capture setting comprises increasing a frame size setting for the video stream to be a larger frame size setting supported by the computing system.

8. The method of claim 4, further comprising:
making, by the computing system, a third determination that a data rate of the generated video stream is higher than an upper threshold data rate,
wherein increasing the camera capture setting is further responsive to making the third determination.

9. The method of claim 8, further comprising:
making, by the computing system, a fourth determination that the computing system is transmitting the generated video stream via a Wi-Fi connection; and
responsive to making the fourth determination, selecting, by the computing system, the upper threshold data rate to be a value in a range of 1335 to 1425 kilobits per second.

10. The method of claim 8, further comprising:
making, by the computing system, a fourth determination that the computing system is transmitting the generated video stream via a cellular network connection; and
responsive to making the fourth determination, selecting, by the computing system, the upper threshold data rate to be a value in a range of 450 to 550 kilobits per second.

11. The method of claim 1, wherein using the determined amount of packets in the memory buffer and the determined time period since the camera capture setting was last adjusted as a basis to adjust the camera capture setting comprises:
making, by the computing system, a first determination that the determined amount of packets in the memory buffer is greater than a threshold amount of packets;
making, by the computing system, a second determination that the determined time period since the camera capture setting was last adjusted is greater than a threshold time period; and
responsive to making the first and second determinations, decreasing, by the computing system, the camera capture setting.

12. The method of claim 11, wherein the threshold amount of packets is a value in a range of 20-35 packets, and wherein the threshold time period is a value in a range of 1-10 seconds.

13. The method of claim 11, wherein decreasing the camera capture setting comprises decreasing the camera capture setting by a frame rate setting increment that is a value in a range from 10 frames per second to 20 frames per second.

14. The method of claim 11, wherein the computing system supports multiple frame sizes for the video stream ranging from a smallest frame size to a largest frame size,
wherein decreasing the camera capture setting comprises decreasing a frame size setting for the video stream to be a smaller frame size setting supported by the computing system.

15. The method of claim 11, further comprising:
making, by the computing system, a third determination that a data rate of the generated video stream is lower than a lower threshold data rate,
wherein decreasing the camera capture setting is further responsive to making the third determination.

16. The method of claim 15, further comprising:
making, by the computing system, a fourth determination that the computing system is transmitting the generated video stream via a Wi-Fi connection; and
responsive to making the fourth determination, selecting, by the computing system, the lower threshold data rate to be a value in a range of 450 to 550 kilobits per second.

17. The method of claim 15, further comprising:
making, by the computing system, a fourth determination that the computing system is transmitting the generated video stream via a cellular network connection; and
responsive to making the fourth determination, selecting, by the computing system, the lower threshold data rate to be a value in a range of 50 to 150 kilobits per second.

18. The method of claim 1, wherein the computing system is a first computing system, the method further comprising:
while generating the video stream:
(iv) transmitting, by the first computing system, to a second computing system, the video stream, wherein the second computing system is configured for receiving the video stream from the first computing system and for broadcasting the video stream.

19. The method of claim 1, further comprising:
presenting, by the computing system, via a user interface, an indication of the adjusted camera capture setting.

20. A non-transitory computer readable medium having stored thereon instructions that, upon execution by a processor, cause performance of a set of acts comprising:
receiving, by a computing system, video content captured by a camera operating in accordance with a camera capture setting;
encoding, by the computing system, in accordance with one or more encoding parameters, the video content to generate a video stream representing the video content; and
while generating the video stream:
(i) determining, by the computing system, an amount of packets in a memory buffer;
(ii) determining, by the computing system, a time period since the camera capture setting was last adjusted; and
(iii) using, by the computing system, the determined amount of packets in the memory buffer and the determined time period since the camera capture setting was last adjusted as a basis to adjust the camera capture setting.

21. A computing system comprising:
a camera; and
a memory buffer,
wherein the computing system is configured for performing a set of acts comprising:
receiving video content captured by the camera operating in accordance with a camera capture setting;
encoding, in accordance with one or more encoding parameters, the video content to generate a video stream representing the video content; and
while generating the video stream:
(i) determining an amount of packets in the memory buffer;
(ii) determining a time period since the camera capture setting was last adjusted; and
(iii) using the determined amount of packets in the memory buffer and the determined time period since the camera capture setting was last adjusted as a basis to adjust the camera capture setting.

22. The method of claim 1,
wherein receiving video content captured by the camera operating in accordance with a camera capture setting comprises receiving video content captured by the camera operating in accordance with a frame size setting,
wherein determining the time period since the camera capture setting was last adjusted comprises determining a time period since the frame size setting was last adjusted, and
wherein using the determined amount of packets in the memory buffer and the determined time period since the camera capture setting was last adjusted as a basis to adjust the camera capture setting comprises using the determined amount of packets in the memory buffer and the determined time period since the frame size setting was last adjusted as a basis to adjust the frame size setting.

23. The method of claim 1,
wherein receiving video content captured by the camera operating in accordance with a camera capture setting comprises receiving video content captured by the camera operating in accordance with a shutter speed setting,
wherein determining the time period since the camera capture setting was last adjusted comprises determining a time period since the shutter speed setting was last adjusted, and
wherein using the determined amount of packets in the memory buffer and the determined time period since the camera capture setting was last adjusted as a basis to adjust the camera capture setting comprises using the determined amount of packets in the memory buffer and the determined time period since the shutter speed setting was last adjusted as a basis to adjust the shutter speed setting.

* * * * *